United States Patent
Son

(10) Patent No.: US 9,047,603 B2
(45) Date of Patent: Jun. 2, 2015

(54) CERTIFICATION MOBILE TERMINAL AND ELECTRONIC COMMERCE SYSTEM AND METHOD USING THE SAME

(75) Inventor: Jeung-Yeup Son, Seoul (KR)

(73) Assignee: KT Corporation, Seongnam (KR)

( * ) Notice: Subject to any disclaimer, the term of this patent is extended or adjusted under 35 U.S.C. 154(b) by 2178 days.

(21) Appl. No.: 10/586,099

(22) PCT Filed: Jan. 14, 2005

(86) PCT No.: PCT/KR2005/000128
§ 371 (c)(1),
(2), (4) Date: Oct. 3, 2007

(87) PCT Pub. No.: WO2005/067402
PCT Pub. Date: Jul. 28, 2005

(65) Prior Publication Data
US 2008/0077534 A1 Mar. 27, 2008

(30) Foreign Application Priority Data
Jan. 14, 2004 (KR) .................. 10-2004-0002633

(51) Int. Cl.
*G06Q 20/00* (2012.01)
*G06Q 20/40* (2012.01)
*G06Q 20/02* (2012.01)
(Continued)

(52) U.S. Cl.
CPC .............. *G06Q 20/401* (2013.01); *G06Q 20/02* (2013.01); *G06Q 20/12* (2013.01); *G06Q 20/32* (2013.01); *G06Q 20/3223* (2013.01);
(Continued)

(58) Field of Classification Search
USPC ..................................... 705/64, 75
See application file for complete search history.

(56) References Cited

U.S. PATENT DOCUMENTS 6,847,816 B1 * 1/2005 Sarradin ................. 455/407
2001/0037264 A1 * 11/2001 Husemann et al. ........... 705/26
(Continued)

FOREIGN PATENT DOCUMENTS

EP 1 161 055 A2 12/2001
JP 10-320458 A 12/1998
(Continued)

OTHER PUBLICATIONS

PCT/KR2005/000128 International Search Report, Aug. 8, 2005.
(Continued)

*Primary Examiner* — Tsan-Yu J Huang
(74) *Attorney, Agent, or Firm* — Alston & Bird LLP

(57) ABSTRACT

Disclosed are a certification mobile terminal, and an electronic transaction system and method using the same. A certificate is downloaded to a mobile terminal from a certification authority. In a wired electronic transaction, a user's transaction history is provided to the mobile terminal from a service providing server or a user's transaction terminal, and the mobile terminal digitally signs the transaction history by using a stored digital certificate and provides the digitally signed transaction history to the service providing server or the transaction terminal so that the service providing server may finally receive the digitally signed transaction history. The service providing server settles the transaction with the user according to the digitally signed transaction history, and provides a service to the user. Also, in the offline transaction, the certificate stored in the mobile terminal is provided to a system to thereby execute stable transactions based on the certificate.

13 Claims, 7 Drawing Sheets

(51) Int. Cl.
*G06Q 20/12* (2012.01)
*G06Q 20/32* (2012.01)
*G06Q 20/38* (2012.01)

(52) U.S. Cl.
CPC ......... *G06Q 20/382* (2013.01); *G06Q 20/3821* (2013.01); *G06Q 20/38215* (2013.01); *G06Q 20/3829* (2013.01)

(56) References Cited

U.S. PATENT DOCUMENTS

| | | | | |
|---|---|---|---|---|
| 2002/0112171 A1* | 8/2002 | Ginter et al. | ........... | 713/185 |
| 2002/0194119 A1* | 12/2002 | Wright et al. | ........... | 705/38 |
| 2002/0198849 A1* | 12/2002 | Piikivi | ........... | 705/76 |
| 2003/0191721 A1* | 10/2003 | Fiammante | ........... | 705/65 |

FOREIGN PATENT DOCUMENTS

| | | |
|---|---|---|
| JP | 2001-117984 A | 4/2001 |
| JP | 2002-505458 A | 2/2002 |
| JP | 2002-101459 A | 4/2002 |
| JP | 2003-303175 A | 10/2003 |
| JP | 2003-345752 A | 12/2003 |
| WO | WO99/44114 | 9/1999 |
| WO | WO 03/105037 A1 | 12/2003 |

OTHER PUBLICATIONS

"Vendor Tendency: Ericsson immersed in finding a way out of trouble for portable phone market vendors at the transition stage from 2.5G to 3G"; Telecommunication, vol. 19, No. 6, RIC Telecom Co., Ltd.; May 25, 2002; pp. 38-43; Japan.

* cited by examiner

CERTIFICATION MOBILE TERMINAL AND ELECTRONIC COMMERCE SYSTEM AND METHOD USING THE SAME

TECHNICAL FIELD

The present invention relates to a transaction system and method. More specifically, the present invention relates to a system and method for a transaction system and a method on a network using a certification mobile terminal.

BACKGROUND ART

As information communication technology has greatly developed and information communication networks have spread, electronic document based electronic transaction such as Internet shopping, banking, auction, stocks, business-to-business electronic commerce and governmental affairs have also increased. However, the electronic transactions are executed on the networks without the buyer meeting the seller, and hence, it is impossible to identify the buyer or the seller, or to check whether transacted contents are forged or altered. Also it is difficult to prevent denial of transactions.

Accordingly, techniques for using a digital signature, which has the same authority as that of a legal seal in the real world, to transmit and receive electronic documents have recently been developed, and services for verifying the relation between the owner of a digital signature and the key used for a digital signature have been provided.

In general, when a user visits a certificate register authority, is identified, and request issuance of a certificate, the certificate register authority provides the user's information to a certification authority server which provides certificates on the network and requests registration, and when the user accesses the certification authority server and requests the issuance of a certificate on the network therefrom, the certification authority issues a certificate and provides the same to the user's terminal, and the user then uses the certificate to safely execute transactions such as Internet shopping, banking, auction, and stocks on the network.

However, the user is allowed to use the certificate only through the corresponding terminal (e.g., wired or wireless terminals including a computer and a cell phone) to which the certificate is downloaded. In particular, the mobility of the certificate is further restricted when the certificate is downloaded to a wired terminal.

DISCLOSURE OF INVENTION

Technical Problem

It is an advantage of the present invention to provide a certificate based electronic commerce without restriction of location.

It is another advantage of the present invention to improve the mobility of a certificate by using a mobile terminal.

It is still another advantage of the present invention to allow off-line transactions using the certificate.

Technical Solution

In a first aspect of the present invention, an electronic transaction system, connected to a transaction terminal and a certification mobile terminal through a network, and performing transactions according to a user's request, comprises: a transaction processor for performing a transaction according to a request provided by the transaction terminal; a message sender for receiving a transaction history from the transaction terminal, and transmitting a message which notifies receipt of the transaction history to the certification mobile terminal which corresponds to a mobile phone number provided by the transaction terminal; a transaction history sender for providing the transaction history to the certification mobile terminal when the certification mobile terminal receives the message and performs an access; a certifier for receiving the digitally signed transaction history from the certification mobile terminal, and verifying the digitally signed transaction history; and a service provider for providing a service corresponding to the transaction to the transaction terminal when the transaction history is verified.

The electronic transaction system further comprises a history database for storing mobile phone numbers and corresponding transaction histories for respective users, and the transaction history sender uses the phone number of the accessing certification mobile terminal to find a corresponding transaction history from the history database and transmit the transaction history to the certification mobile terminal.

The electronic transaction system further comprises a certification authority server for issuing digital certificates, and the certification mobile terminal receives a digital certificate from the certification authority server.

In a second aspect of the present invention, a certification mobile terminal, connected to a service providing server and a certification authority server through a network and performing certification for settling transactions between a user's transaction terminal and the service providing server, comprises: a certificate receiver for accessing the certification authority server and receiving a digital certificate; a storage unit for storing the digital certificate; a transaction history receiver for receiving a message which notifies provision of the transaction history by the transaction terminal from the service providing server, accessing the service providing server, and receiving the transaction history; and a digital signature processor for digitally signing the transaction history with the digital certificate stored in the storage unit, and providing the digitally signed transaction history to the service providing server.

In a third aspect of the present invention, a certification mobile terminal, connected to a user's transaction terminal through a network and performing certification for settling a transaction between the transaction terminal and a service provider, comprises: a storage unit for storing a digital certificate; an interface for communicating with the transaction terminal; and a digital signature processor for receiving a transaction history from the transaction terminal through the interface, digitally signing the transaction history with a digital certificate stored in the storage unit, and transmitting the digitally signed transaction history to the transaction terminal through the interface.

In a fourth aspect of the present invention, a certification mobile terminal, connected to an off-line service providing system through a network and performing certification for settling transaction between a user and the service providing system, comprises: a storage unit for storing digital certificates; an interface for communicating with the service providing system; and a digital signature processor for providing a digital certificate stored in the storage unit to the service providing system through the interface according to a user's request.

The certification mobile terminal is connected to a certification authority server through the network, and accesses the certification authority server to receive the digital certificate and stores the same in the storage unit.

In a fifth aspect of the present invention, an electronic transaction method, for a system connected to a user's transaction terminal and a certification mobile terminal through a network and performing transactions according to the user's request, comprises: (a) inquiring about a certification method for settling a transaction when the user requests a transaction through the transaction terminal; (b) transmitting a message which notifies receipt of a transaction history to a certification mobile terminal which corresponds to a mobile phone number specified by the user when the user selects a digital certificate based certification and provides the transaction history; (c) providing the transaction history to the certification mobile terminal when the certification mobile terminal receives the message and performs an access; (d) receiving a digitally signed transaction history from the certification mobile terminal, and verifying the digitally signed transaction history; and (e) providing a service to the transaction terminal according to the transaction when the transaction history is verified.

In a sixth aspect of the present invention, an electronic transaction method for performing transactions with a service providing server on a network, comprises: (a) allowing a user to use a transaction terminal to access the service providing server and request a transaction; (b) allowing the transaction terminal to transmit a transaction history to a certification mobile terminal storing a digital certificate; (c) allowing the certification mobile terminal to use the digital certificate and digitally sign the transaction history, and transmit the digitally signed transaction history to the transaction terminal; (d) allowing the transaction terminal to transmit the digitally signed transaction history to the service providing server; and (e) allowing the transaction terminal to receive a service from the service providing server according to the digitally signed transaction history.

The electronic transaction method further comprises: allowing the certification mobile terminal to access a certification authority server on the network and receive a digital certificate.

In a seventh aspect of the present invention, a method for transacting with an off-line service providing system, comprises: (a) allowing a user to select one of the transactions provided by the service providing system; (b) allowing the service providing system to certify the user when a certification mobile terminal storing a digital certificate transmits the digital certificate to the service providing system; and (c) allowing the service providing system to provide a service according to the transaction selected by the user when the user is certified.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

BEST MODE FOR CARRYING OUT THE INVENTION

Figure 1:
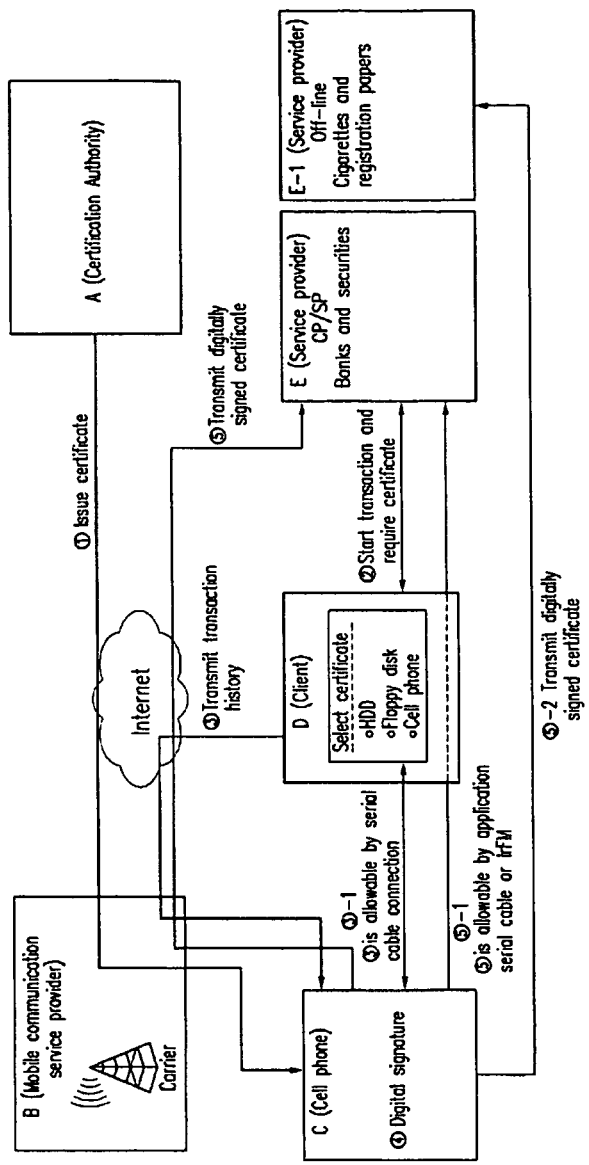
FIG. 1 shows an electronic transaction method according to an exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

FIG. 1 shows an electronic transaction method according to an exemplary embodiment of the present invention.

A user uses a mobile terminal C to receive a certificate from a certification authority A, and uses the certificate downloaded to the mobile terminal C (referred to as a digital certificate hereinafter) to receive certification in the case of electronic transactions through a wired terminal D or off-line transactions.

In order to apply the digital certificate to wired electronic transactions, the user, or a service provider E transacting with the user, provides wired transaction contents to a mobile terminal in which the digital certificate is stored, and the user uses the mobile terminal to apply a digital signature to the transaction contents by using the digital certificate. Therefore, the mobile terminal provides digitally signed transaction contents to the user's wired terminal, or the service provider E, to execute the transactions.

Also, in the case of off-line transactions, the user provides the digital certificate stored in the mobile terminal to the service provider (e.g., a vending machine) to receive certification.

A first exemplary embodiment for using the digital certificate for wired transactions will now be described.

Figure 2:
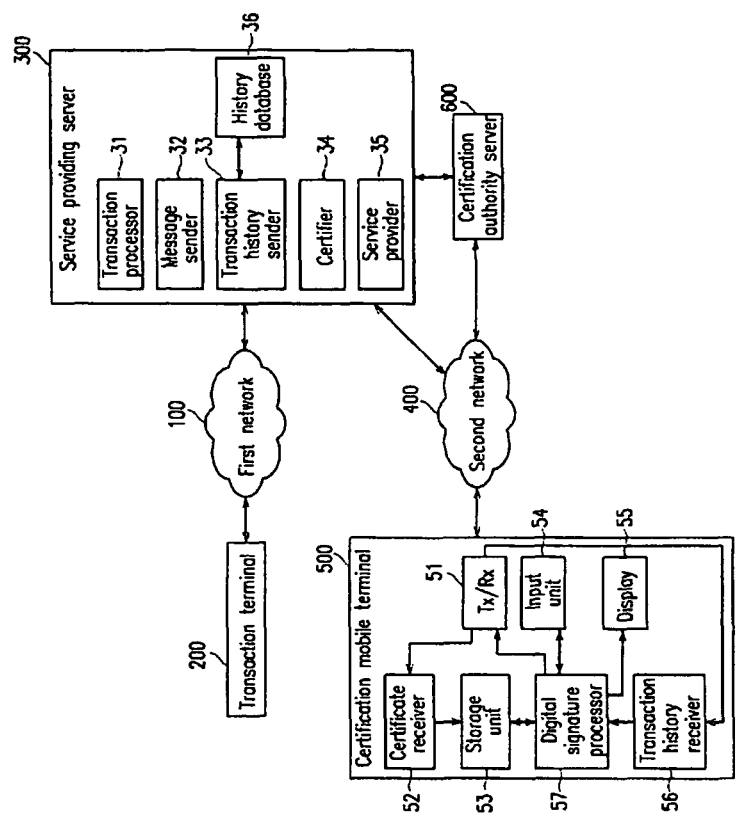
FIG. 2 shows a block diagram of an electronic transaction system according to a first exemplary embodiment of the present invention.

FIG. 2 shows a block diagram of an electronic transaction system (referred to as a transaction system hereinafter) according to a first exemplary embodiment of the present invention.

As shown in the transaction system, the user's transaction terminal 200 is connected to a service providing server 300 through a first network 100, and the user's certification mobile terminal 500 is connected to a certification authority server 600 through a second network 400. The first network 100 includes a cable network and the second network 400 includes a wireless network.

The transaction terminal 200 includes a terminal (including a wired terminal such as a personal computer) which the user uses to transact with the service providing server 300 and to receive a desired service through the first network 100.

The certification mobile terminal 500 (referred to as a mobile terminal hereinafter) is a terminal (including a cell phone and a PDA) in which the digital certificate provided by the certification authority server 600 is stored. In detail, the mobile terminal 500 includes: a transmitter and receiver 51 for transmitting and receiving signals (including information and data) through the second network 400; a storage unit 53 for storing a digital certificate from the transmitter and receiver 51; a certificate receiver 52 for receiving the digital certificate; an input unit 54 (including a keypad) for interface with a user; a display 55; a transaction history receiver 56 for accessing the service providing server 300 and receiving the user's transaction information according to a message received status through the transmitter and receiver 51; and a digital signature processor 57 for applying a digital signature to the user's transaction information by using the digital certificate stored in the storage unit 53.

The service providing server 300 provides a service to the user according to a request by the user who accesses the networks 100 and 400, in particular, after the user is certified through a digital certificate and settles a transaction. For this purpose, the service providing server 300 includes: a transaction processor 31 for processing the transaction according to the user's request transmitted by the transaction terminal 200; a message sender 32 for transmitting a message of transaction history receipt to the mobile terminal 500 specified by the user when a transaction history for settling the transaction is provided by the user; a transaction history sender 33 for receiving the message and transmitting the transaction history to the accessed mobile terminal 500; a certifier 34 for transmitting the digitally signed transaction history transmitted by the mobile terminal 500 to the certification authority server 600 to inquire about a certified status; a service provider 35 for providing a server to the transaction terminal 200 when the digitally signed transaction history is certified; and a history database 36 for storing transaction history data for respective users.

A mobile communication service system (not illustrated) is provided between the mobile terminal 500 and one of the service providing server 300 and the certification authority server 600 to perform data communication between the mobile terminal 500 and one of the servers 300 and 600, and in addition, the service providing server 300 may be installed in the mobile communication service system. The above-noted data communication between the mobile terminal 500 and one of the servers 300 and 600 through the mobile communication service system will not be described since it is well know to a person skilled in the art.

A transaction method according to the first exemplary embodiment of the present invention will be described based on the above-described configuration.

Figure 3:
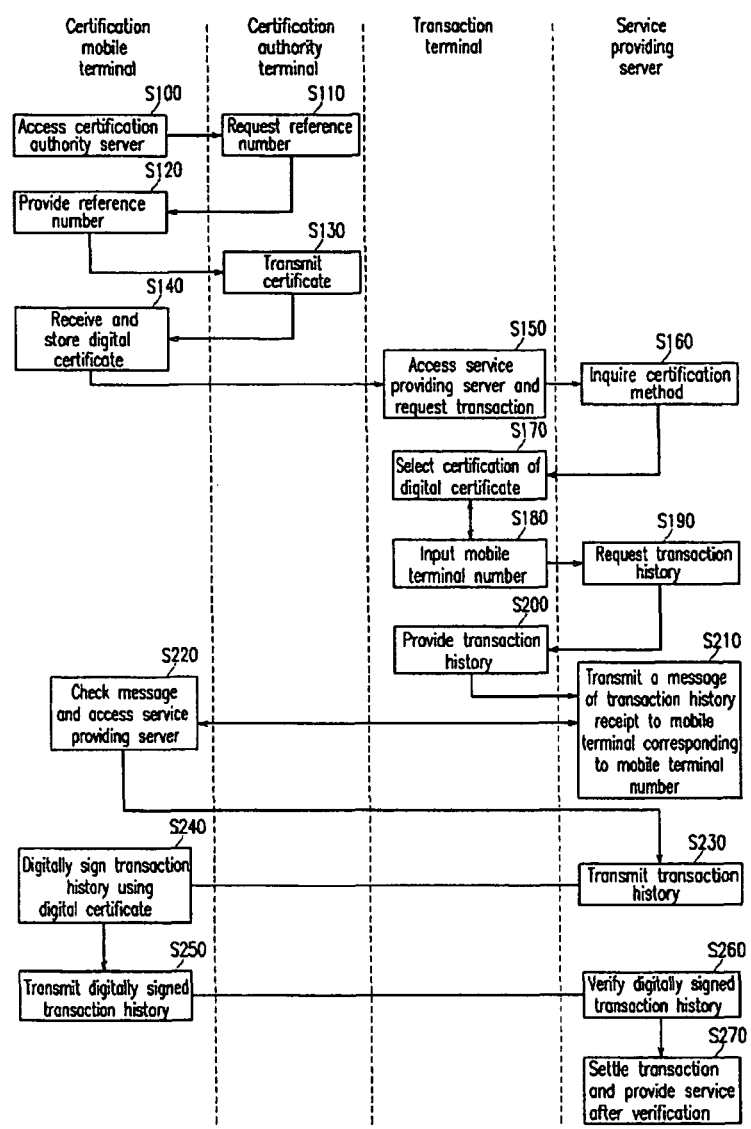
FIG. 3 shows a flowchart for an electronic transaction process according to a first exemplary embodiment of the present invention.

FIG. 3 shows a flowchart for an electronic transaction process using a certificate according to the first exemplary embodiment of the present invention.

In order to use a digital certificate, the user visits a service provider (or a certification authority), identifies the user there, and receives a reference number for downloading a digital certificate. In detail, the user submits user information including: a name; a residence registration number; an D; an address; a telephone number; and a post code to the service provider, and the service provider then provides a reference number to the user. The service provider provides the reference number and user information to the certification authority.

The user uses the mobile terminal 500 to access the certification authority server 600. In detail, when the user inputs a URL corresponding to the certification authority server 600 to the mobile terminal 500, the URL is converted into a WML, HTML, HDML, or XML through a wireless gate including the wireless application protocol (WAP), the converted URL is transmitted to the mobile communication service system through the second network 400, and the mobile communication service system connects the mobile terminal 500 to the certification authority server 600 according to the converted URL. In this instance, the user may directly input the URL to access the certification authority server, or, either use a button or select a direct link to access the certification authority server in Step S100.

The certification authority server 600 requests the mobile terminal 500 to input a reference number, the user inputs the reference number to the input unit 54, and the certificate receiver 52 of the mobile terminal 500 transmits the reference number to the certification authority server 600 through the transmitter and receiver 51 in Steps S110 and S120. The certification authority server 600 transmits a digital certificate to the mobile terminal 500 depending on whether the reference number provided by the service provider corresponds to the reference number input by the user in Step S130.

When the reference numbers correspond to each other, the certificate receiver 52 receives the digital certificate from the certification authority server 600 through the mobile communication service system and stores the digital certificate in the storage unit 53 in Step S140. The digital certificate includes user information and password for signature.

When downloading the digital certificate to the mobile terminal from the certification authority server, the user is able to execute electronic commerce with banks and securities corporations by using the digital certificate on-line or off-line As shown in FIG. 3, when the user uses the transaction terminal 200 to access the service providing server 300 on the first network 100 and request a banking transaction, the transaction processor 31 inquires to the user about a certification method (e.g., certificate based certification or password based certification) in Steps S150 and S160. When the user selects certificate based certification, and in particular digital certificate based certification (the user inputs a mobile phone number of the mobile terminal which stores the digital certificate in this case), the service providing server 300 requests desired contents (including the user's account number and password for a transaction with a bank, a stock account number and buy and sell items and amounts for a transaction with a securities company, and the user's credit card number, expiration date, and a password for electronic commerce), and the transaction terminal 200 provides the above-noted contents input by the user, that is, a transaction history, to the service providing server 300 in Steps S170 to S200. In this instance, the transaction terminal 200 encrypts the transaction history by using a transport layer security/secure socket layer (TLS/SSL) for information security and transmits the encrypted transaction history to the service providing server 300.

The message sender 32 receives the transaction history from the transaction terminal 200, and transmits a short message service (SMS) message or a multimedia message service (MMS) message to a mobile terminal corresponding to the mobile phone number input by the user to thereby notify the mobile terminal of receipt of the transaction history in Step S210. In this instance, the message includes link information on the service providing server 300 so that the user may be called back and be accessed to the service providing server 300 or the message may include receipt contents on the transaction history without the link information. The service providing server 300 matches the mobile phone number or user identification information (including an D and a residence registration number) with the transaction history, and stores matched contents in the history database 36 for a subsequent transaction certification process.

When the message transmitted from the service providing server 300 is displayed on the mobile terminal 500, the user uses the message to access the service providing server 300 or uses another access process to access the same in Step S220, and receives the transaction history which was provided in the case of a transaction using the transaction terminal 200. In this instance, as shown in FIG. 3, the service providing server 300 uses the mobile phone number of the accessing mobile terminal 500 to find the corresponding user's transaction history from the history database 36 and provide the transaction history to the transaction terminal 200 in Step S230, and the transaction history receiver 56 receives a transaction history from the service providing server 300 and transmits the transaction history to the digital signature processor 57.

The digital signature processor 57 receives the transaction history, and displays a screen on the display 55 to request input of a password for a digital signature, and when the password input through the input unit 54 corresponds to the password included in the digital certificate, the digital signature processor 57 generates a digital signature key. The digital signature processor 57 uses the digital signature key to digitally sign the transaction history, and transmits the digitally signed transaction history to the service providing server 300 through the transmitter and receiver 51 in Steps S240 and S250. That is, the digital signature processor 57 digitally signs the user information included in the digital certificate and the transaction history by using the digital signature key, and transmits the digitally signed user information and transaction history to the service providing server 300.

The certifier 34 uses a public key to verify the digitally signed transaction history transmitted by the mobile terminal 500. In detail, when the user information included in the corresponding user's digital certificate provided by the certification authority server 600 corresponds to the user information provided by the mobile terminal 500, the service provider 35 performs the transaction (e.g., reference and transfer in the case of banking transaction, stock buy and sell in the case of securities transaction, and settlement in the case of electronic commerce) requested by the user through the transaction terminal 200, and provides a service in Steps S260 and S270.

According to the first embodiment, portability of the certificate is improved by downloading the certificate to the user's mobile terminal and using the same for the wired electronic transaction. Also, when the user uses a wired terminal to execute transactions, the transaction history is transmitted through the service providing server to the mobile terminal storing the certificate and is then digitally signed, and accordingly, the user can execute desired transactions using the certificate at any location.

Further, the service providing server transmits the transaction history to the user's mobile terminal to digitally sing the same in the first embodiment, and differing from this, it is possible for the user to provide the transaction history to the user's mobile terminal from the transaction terminal and digitally sign the same.

A method for certifying wired electronic commerce according to information transmission between a transaction terminal and a mobile terminal according to a second exemplary embodiment will be described.

Figure 4:
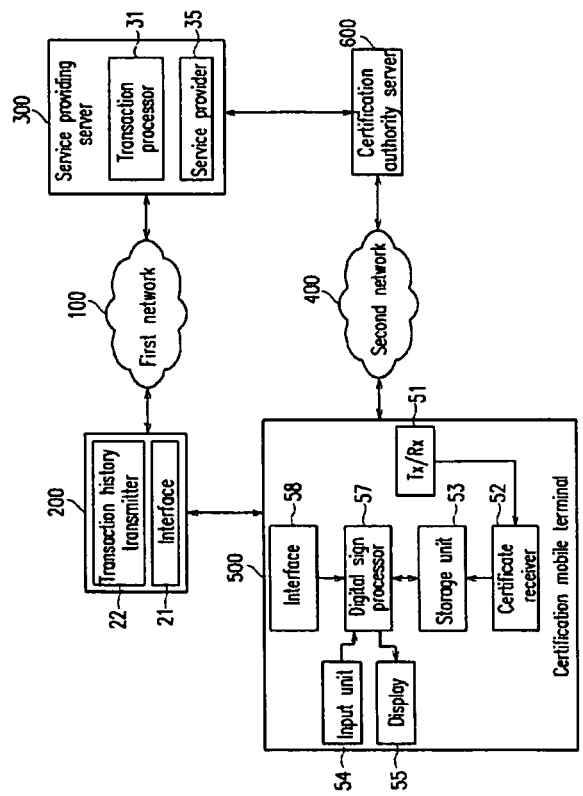
FIG. 4 shows a block diagram of an electronic transaction system according to a second exemplary embodiment of the present invention.
Figure 5:
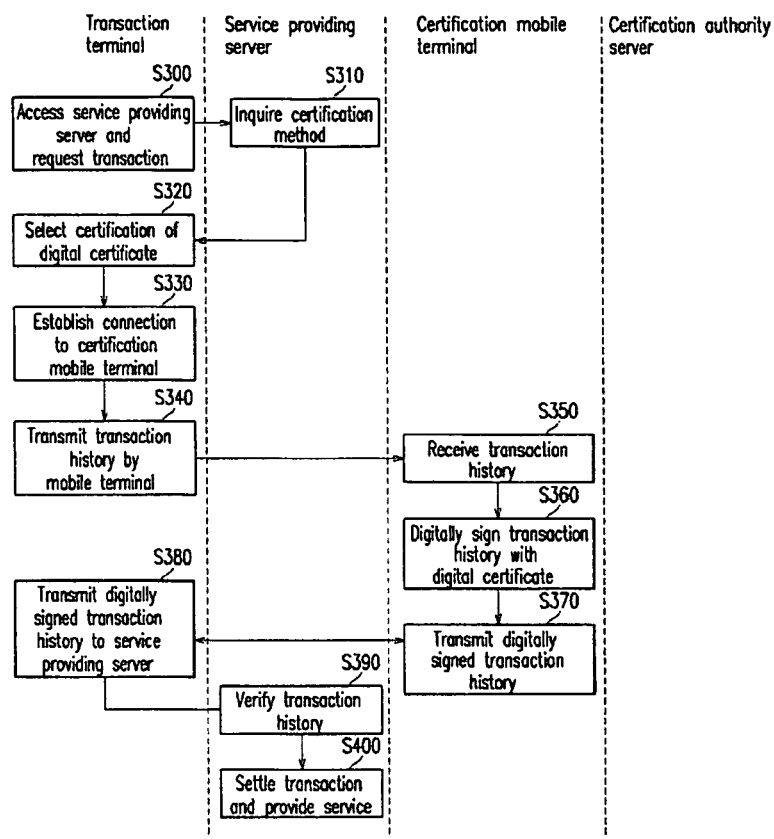
FIG. 5 shows a flowchart for an electronic transaction process according to a second exemplary embodiment of the present invention.

FIG. 4 shows a block diagram of an electronic transaction system according to a second exemplary embodiment of the present invention, and FIG. 5 shows a flowchart for an electronic transaction process according to the second exemplary embodiment of the present invention.

The transaction terminal 200 communicates with the mobile terminal 500. To achieve this operation, the transaction terminal 200 includes an interface 21 for communicating with the mobile terminal 500, and a transaction history transmitter 22 for transmitting the transaction history to the mobile terminal 500 through the interface 21 and transmitting the digitally signed transaction history provided by the mobile terminal 500 through the interface 21 to the service providing server 300.

The mobile terminal 500 and the service providing server 300 according to the second embodiment have the same configurations as those according to the first embodiment, except that the mobile terminal 500 further includes an interface 58 for transmitting and receiving information to/from the transaction terminal 200, and the service providing server 300 includes no devices for storing or transmitting the transaction history (i.e. no transaction history sender, transaction history database, or certifier).

A transaction process according to the second exemplary embodiment of the present invention will be described based on the above-described configuration.

Having downloaded a digital certificate to the mobile terminal 500 from the certification authority server 600 in a like manner of the first embodiment, the user uses the transaction terminal 200 to access the service providing server 300 and request a transaction in Step S300 as shown in FIG. 5.

The user then selects a digital certificate based certification method in Steps S310 and S320, and connects the user's transaction terminal 200 to the mobile terminal 500 in a wired or wireless manner to transmit the transaction history to the mobile terminal 500 in Steps S330 and S340. For example, the transaction terminal 200 is connected to the mobile terminal 500 through a serial cable, and the transaction history transmitter 22 transmits the transaction history input by the user to the mobile terminal 500 through the interface 21. Also, the transaction terminal 200 can transmit the transaction history to the mobile terminal 500 by using not the cable but an infrared communication method. In this instance, the transaction terminal 200 requires a transmitter for converting information into infrared signals and transmitting the infrared signals, and the mobile terminal 500 needs a device for receiving the infrared signals and restoring the same into original information, and the interfaces 21 and 58 of the terminals 200 and 500 transmit and receive the transaction history via the infrared communication method. That is, the interface 21 converts the transaction history provided by the transaction history transmitter 22 into infrared signals and transmits the infrared signals to the mobile terminal 500, and the interface 58 of the mobile terminal 500 receives the infrared signals, restores original information, and provides the same to the digital signature processor 57. The transaction terminal 200 can transmit the transaction history to the mobile terminal 500 by using other available methods in addition to the above-exemplified method.

When receiving the transaction history from the transaction terminal 200 through the interface 58, the digital signature processor 57 generates a digital signature key according to an input password to digitally sign the transaction history, and transmits the digitally signed transaction history and user information to the transaction terminal 200 through the interface 58 in Steps S350 to S380.

The transaction history transmitter 22 of the transaction terminal 200 receives the digitally signed transaction history from the mobile terminal 500 and provides the same to the service providing server 300. The service providing server 300 uses a public key to verify the digitally signed transaction history in a like manner of the first embodiment, settles the transaction with the user, and provides the corresponding service in Steps S390 and S400.

A method for applying the digital certificate to off-line transactions other than to on-line transactions according to the first and second embodiments will now be described.

Figure 6:
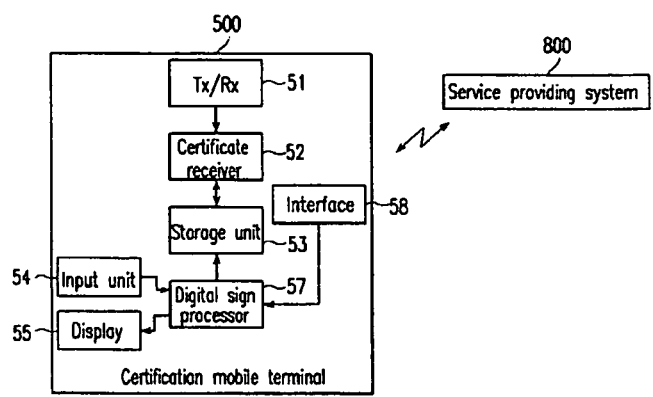
FIG. 6 shows a block diagram of an electronic transaction system according to a third exemplary embodiment of the present invention.
Figure 7:
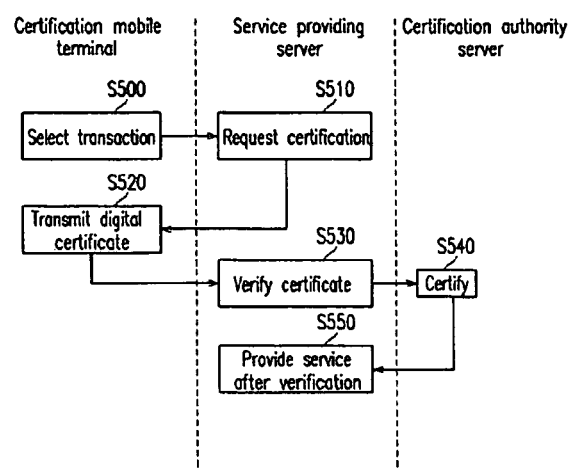
FIG. 7 shows a flowchart for an electronic transaction process according to a third exemplary embodiment of the present invention.

FIG. 6 shows an off-line electronic transaction system according to a third exemplary embodiment of the present invention and FIG. 7 shows an electronic transaction process according to the third exemplary embodiment of the present invention.

As shown in FIG. 6, the mobile terminal 500 includes a transmitter and receiver 51, a certificate receiver 52, an input unit 54, a storage unit 53, a digital signature processor 57, and an interface 58 which also may function as an infrared communicator for converting information into infrared signals and transmitting the infrared signals.

The service providing system 800 represents an off-line service providing system including a vending machine and a device for issuing registration papers.

As shown in FIG. 7, the user downloads the digital certificate to the mobile terminal 500, and is certified by using the mobile terminal 500 when the user attempts to execute an off-line transaction. For example, as shown in FIG. 6, when desiring to buy cigarettes from a vending machine or obtaining a registration paper from an automatic registration paper issuing machine, the user inputs a desired item (e.g., selection of cigarettes or selection of issuance of a residence registration sheet) to the machine, uses the user's mobile terminal 500 to provide a certificate to the corresponding service providing system 800 and be certified as a suitable user in Step S500.

For example, when the user requests a transmission of certificate through the input unit 54 of the mobile terminal 500, the digital signature processor 57 provides the digital certificate stored in the storage unit 53 to the corresponding service providing system 800 through the interface 58 in Steps S520 and S530 by the infrared communication method exemplified in the second embodiment.

When receiving the digital certificate from the mobile terminal 500, the service providing system 800 uses the public key to select user information from the digital certificate and provides the user information to the certification authority server 600, connected on the network, to request certification in Steps S540 and S550. When the user is certified, the service providing system provides cigarettes to the user or issues corresponding sheets to the user in Step S560.

Accordingly, the user can easily execute desired transactions by using the digital certificate stored in the mobile terminal in the case of off-line transactions.

The above-mentioned "service" includes any kind of transaction on the network based on the user certification, such as contents provision, banking transactions, securities transactions, mailing, and commercial transactions.

A gateway server can be provided between the service providing server and the terminal to relay data communication therebetween. In this case, the gateway server exemplarily relays the SMS provided by the service providing server to the user terminal.

According to the present invention, the user can stably perform on-line and off-line transactions by using the certificate without restriction of location.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. An electronic transaction system, connected to a transaction terminal and a certification mobile terminal through a network and performing transactions according to a user request, comprising:
    a transaction terminal configured to perform a transaction according to a request from a user;
    a service providing server configured to:
        receive the request from the transaction terminal over a first communication network;
        inquire, the transaction terminal, about a certification method;
        receive a selected certification method, user information for the selected certification method, transaction history, and a mobile phone number from the transaction terminal, in response to the inquiry about a certification method;
    transmit a message, to the certification mobile terminal using the mobile phone number, receive a response to the message from the mobile terminal and in response to the received message, match the mobile phone number to the transaction history and provide the transaction history to the mobile terminal;
    receive a digitally signed version of the transmitted transaction history and digitally signed user information from the mobile terminal, verify the received digitally signed transaction history using a public key of the certification mobile terminal, and verify the digitally signed user information using the public key and the received user information for the selected certification method from the transaction terminal; and
    provide a service corresponding to the transaction to the transaction terminal after the digitally signed version of the transmitted transaction history and digitally signed user information is verified.

2. The electronic transaction system of claim 1, further comprising a history database configured to store mobile phone numbers and corresponding transaction histories for respective users, wherein a transaction history sender device is configured to use the mobile phone number of the certification mobile terminal to find a corresponding transaction history from the history database and transmit the transaction history to the certification mobile terminal.

3. The electronic transaction system of claim 1, further comprising a certification authority server configured to issue digital certificates, wherein the certification mobile terminal receives a digital certificate from the certification authority server.

4. The electronic transaction system of claim 1, wherein the message includes link information for accessing the electronic transaction system.

5. The electronic transaction system of claim 1, wherein a message sender device transmits the message in the short message services (SMS) or multimedia messaging service (MMS) format.

6. An electronic transaction method for a system connected to a user's transaction terminal and a certification mobile terminal through a network and performing transactions according to the user's request, the method comprising:
    (a) receiving, via a service providing server, the request from a user;
    (b) receiving, via the service providing server, the request from the transaction terminal over a first communication network;
    (c) inquiring, via the service providing server, about a certification method;

(d) receiving, via the service providing server, a selected certification method, user information for the selected certification method, transaction history, and a mobile phone number from the transaction terminal, in response to the inquiry about a certification method;

(e) transmitting, via the service providing server, a message, to the certification mobile terminal using the mobile phone number, receiving a response to the message from the mobile terminal and in response to the received message, match the mobile phone number to the transaction history and providing the transaction history to the mobile terminal;

(f) receiving a digitally signed version of the transmitted transaction history and digitally signed user information from the mobile terminal, verifying the received digitally signed transaction history using a public key of the certification mobile terminal, and verifying the digitally signed user information using the public key and the received user information for the selected certification method from the transaction terminal; and (g) providing a service to the transaction terminal according to the transaction after verifying the digitally signed version of the transmitted transaction history and digitally signed user information.

7. The electronic transaction method of claim 6 further comprising:

storing, in a history database, mobile phone numbers and corresponding transaction histories for respective users;

finding a corresponding transaction history from the history database using the mobile phone number of the certification mobile terminal; and transmitting the transaction history to the certification mobile terminal.

8. The electronic transaction method of claim 6 further comprising:

issuing digital certificates; and receiving, at the certification mobile terminal, a digital certificate from the certification authority server.

9. The electronic transaction method of claim 6 further comprising generating the message such that the message includes link information for accessing the electronic transaction system.

10. The electronic transaction method of claim 6 further comprising transmitting the message in the short message services (SMS) or multimedia messaging service (MMS) format.

11. The electronic transaction method of claim 6 further comprising storing transaction information in a history database to certify a subsequent transaction.

12. The electronic transaction system of claim 1, wherein the service providing server inquires about a certification method for settling the transaction according to the request provided by the transaction terminal and receives the transaction history with the mobile phone number from the transaction terminal when the transaction terminal selects a digital certificate based certification.

13. The electronic transaction system of claim 1, wherein transaction information is stored in a history database to certify a subsequent transaction.

\* \* \* \* \*